3,609,950
IMPLEMENTS FOR THE LATERAL DISPLACE-
MENT OF CROP LYING ON THE GROUND
Albert Auguste Louis Remy, Senonches, Eure-et-Loir,
France, assignor to C. van der Lely N.V., Maasland,
Netherlands
Filed Oct. 8, 1968, Ser. No. 765,878
Claims priority, application Netherlands, Oct. 12, 1967,
6713828
Int. Cl. A01d 77/06
U.S. Cl. 56—377                                      19 Claims

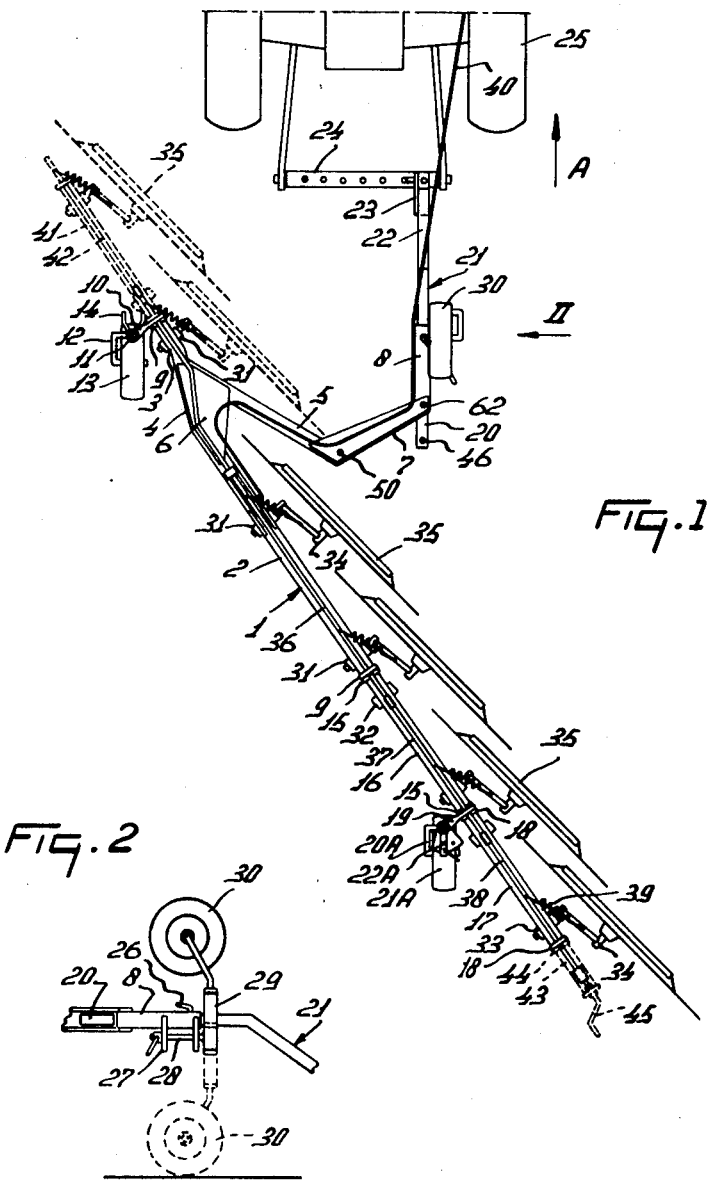

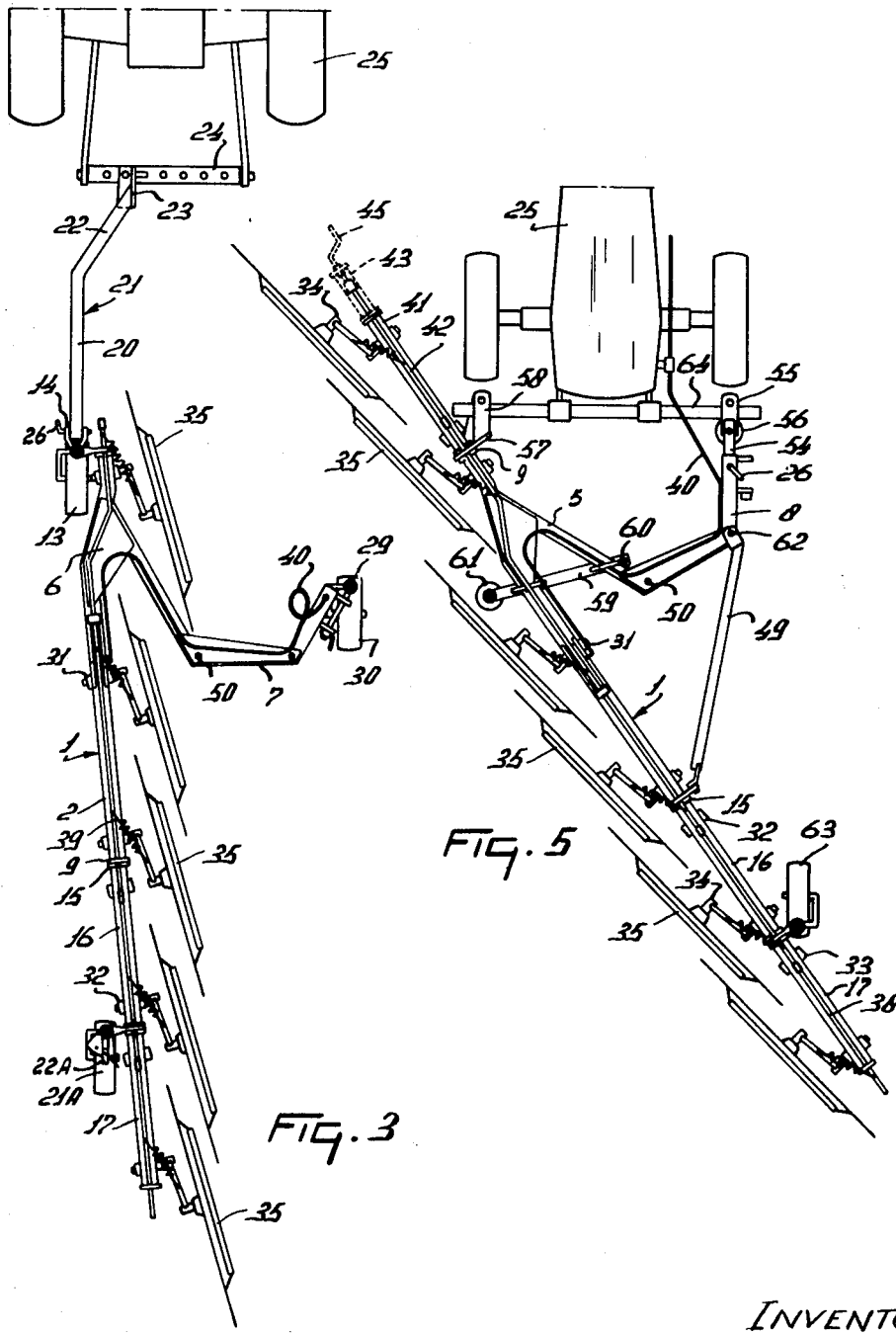

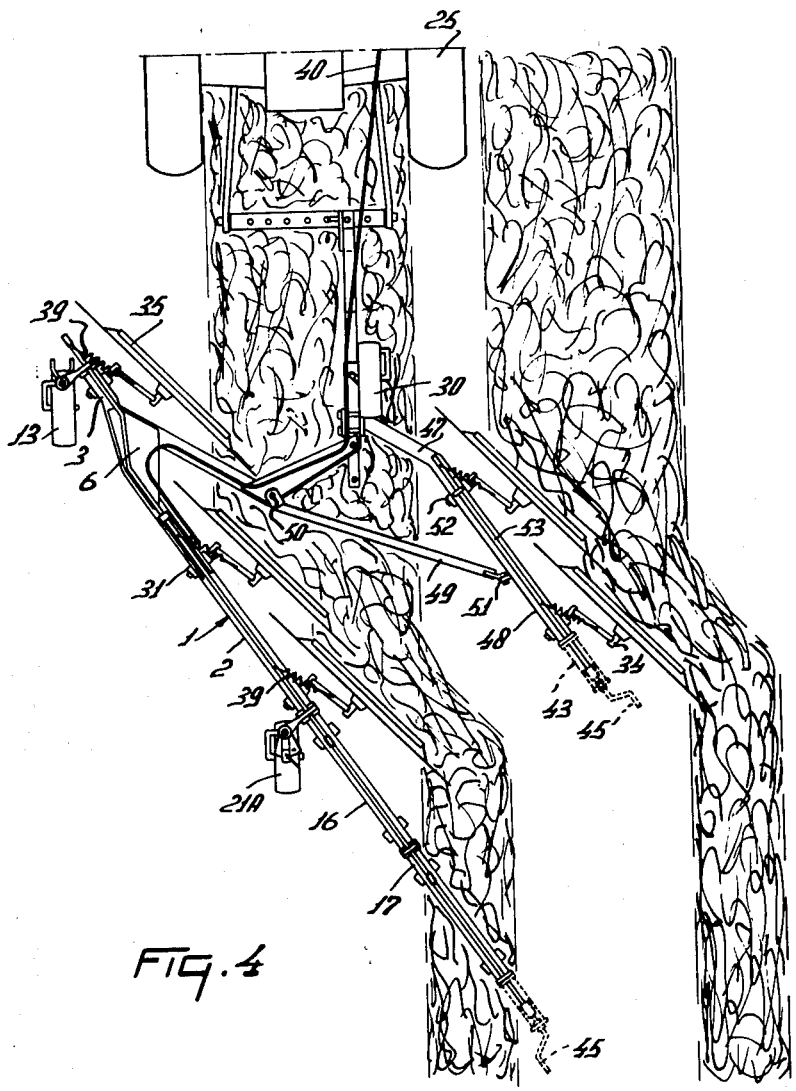

ABSTRACT OF THE DISCLOSURE

A rake implement having frame beams at least one of which has rake wheels mounted thereon. The beams can be detached and rearranged so that the implement can be pushed or pulled by a prime mover. With rearrangement of the beams, the implement can function as a side delivery rake or a swath turner. The beams can also be positioned to place the implement in transport arrangement. A hydraulic system with piston can be connected to a rod extending parallel to the main frame beam and the rod connected to cranks supporting the rake wheels to lift or exert pressure on same.

---

This invention relates to implements for the lateral displacement of crop lying on the ground, such implements being of the kind comprising a frame supported from the ground by at least one ground wheel and a row of at least two rake wheels whose mountings are connected to a main frame beam that is inclined to the intended direction of operative travel of the implement.

An object of the invention is the provision of a simple but efficient implement of this kind.

According to the invention, there is provided an implement of the kind set forth, wherein a second frame beam is rigidly secured to the main beam towards one end of the latter in such a way that, in plan view, the second beam is inclined to the main beam and projects from the connection to the main beam generally towards the opposite end thereof, the end of said second beam remote from the connection to the main beam having a frame portion rigidly secured to it that extends away from the main beam from its connection to said second beam, the frame portion being provided at the end thereof remote from the second beam with at least one coupling part adapted for connection to a tractor or other vehicle.

For a better understanding of the invention, and to show how the same may be carried into effect, reference will now be made, by way of example, to the accompanying drawings, in which:

FIG. 1 is a plan view of a raking implement in accordance with the invention, the raking implement occupying a working position in which it is coupled to the rear of an agricultural tractor.

FIG. 2 is a fragmentary side elevation as seen in the direction indicated by the arrow II of FIG. 1, FIG. 3 is shows the implement of FIG. 1 occupying a position suitable for the non-operative transport thereof, FIG. 4 is a plan view showing the implement operating as a swath turner, and FIG. 5 illustrates the implement occupying a working position in which it will function as a side-delivery rake, the implement being front-mounted on an agricultural tractor.

Referring to the drawings, the implement which is illustrated has a main frame beam 1 which comprises two parts 2 and 3 that are relatively parallel but that are interconnected by an intermediate part 4 whose longitudinal axis is inclined to those of both the parts 2 and 3 by an angle of about 20°. The intermediate part 4 has one end of a second frame beam 5 secured to it in such a way that the longitudinal axis of the beam 5 is inclined to those of the parts 2 and 3 of the main frame beam 1 by an angle of about 30°. The beam 5 is inclined rearwardly, from its connection to the intermediate part 4, with respect to the intended direction of rear-mounted operative travel of the implement which is indicated by an arrow A in FIG. 1 of the drawings. Strengthening plates 6 reinforce the connection between the intermediate part 4 and the second frame beam 5. The end of the second frame beam 5 that is remote from the main frame beam 1 has a forwardly directed (with respect to the direction A) frame portion fastened to it, said frame portion consisting of two frame beams 7 and 8 which enclose an angle of about 135° between them. An angle of about 120° is enclosed between the frame beam 7 and the second frame beam 5 while, during normal straight line travel of the implement, the beam 8 extends parallel or substantially parallel to the direction A. All of the frame beams which have so far been described are preferably of hollow construction having cross sections of square or oblong configuration.

Coupling flanges 9 are provided at the opposite ends of the main frame beam 1, the foremost flange 9 (with respect to the direction A) carrying a laterally projecting support 10 provided with a vertical bearing sleeve in which the upper end of a vertical shaft 11 is rotatably received. The lowermost end of the shaft 11 is integrally connected to an inclined arm 12 whose lowermost end is bent over to form the horizontal axle of a caster ground wheel 13. A forked connection bracket 14 is rigidly secured to the vertical shaft 11. The coupling flange 9 at the rearmost (with respect to the direction A) end of the main frame beam 1 has a similar coupling flange 15 fastened to it by bolts that are not illustrated in the drawings, the coupling flange 15 being rigidly secured to the end of a frame beam 16 in such a way that, when the two coupling flanges 9 and 15 are bolted to one another in the manner illustrated in FIG. 1 of the drawings, the beam 16 extends in axial alignment with the main frame beam 1. The rearmost (with respect to the direction A) end of the frame beam 16 carries a further coupling flange 15 and another frame beam 17 having similar coupling flanges 18 at its opposite ends is fastened to said rearmost flange 15 by further bolts (not illustrated) so as to extend in axial alignment with the part 2 of the main frame beam 1 and the frame beam 16. It will be seen from the drawings that a laterally projecting support 19 is sandwiched between the rearmost flange 15 and the leading flange 18, and support 19 incorporating a vertical sleeve bearing in which a substantially vertical shaft is rotatable. The lowermost end of the substantially vertical shaft is integrally connected by an inclined arm 20A to the horizontal axle of a caster ground wheel 21A. The plane of rotation of the ground wheel 21A can be retained in different angular settings relative to the frame of the implement with the aid of a locking member 22A whose generally known construction can be seen in outline in the drawings.

A horizontal portion 20 of a drawbar 21 is entered through the hollow frame beam 8 in the working position illustrated in FIGS. 1 and 2 of the drawings, the leading (with respect to the direction A) end of the horizontal portion 20 being integrally connected by a forwardly directly and downwardly inclined portion 22 to a foremost portion 23 which is parallel to the portion 20 and which is of L-shaped cross section. As can be seen in FIG. 1 of the drawings, the coupling part of the drawbar 21, which is afforded by the foremost portion 23 thereof, can be connected to the tow bar or tool bar 24 at the rear of an agricultural tractor 25 is known manner with the aid of a vertical pin or the like. The inclined portion 22 of the drawbar 21 makes an angle of about 45° with both of the relatively parallel portions 20 and 23 of said drawbar. A vertical locking pin 26 (FIGS. 2 and 5) is entered transversely through the hollow beam 8 and the portion 20 of the drawbar 21 to prevent disengagement of the drawbar 21 from the frame.

The beam 8 is provided with laterally projecting lugs 27 (FIG. 2) in which a horizontal shaft 28 is turnably received. The leading end of the shaft 28 carries the mounting 29 of a caster ground wheel 30. The ground wheel 30 can be retained in either the inoperative position shown in full lines in FIGS. 1 and 2 of the drawings or the operative position shown in broken lines in FIG. 2 of the drawings with the aid of a simple locking mechanism which is not illustrated in detail but which can be seen in outline of FIG. 2 at the rear end of the shaft 28. The main frame beam 1 is provided with three substantially horizontal sleeve bearings 31 whose longitudinal axes are inclined at angles of about 70° to the longitudinal axes of the parts 2 and 3 of the beam 1. The sleeves 31 are entered transversely through the hollow frame beam 1 and the beams 16 and 17 are provided with similarly constructed and similarly arranged pairs of sleeve bearings 32 and 33 respectively. The longitudinal axes of all the sleeve bearings 31, 32 and 33 are substantially parallel to one another. Cranks 34 have their leading ends (relative to the direction A) turnably received in the sleeve bearings 31, 32 and 33, the rearmost ends of said cranks 34 affording the axes of rotation of corresponding rake wheels 35.

It can be seen from FIG. 1 of the drawings that the frame beams 16 and 17 are identical and that both of them are symmetrical with respect to their mid-points. Thus, said beams 16 and 17 may be interchanged and/or reversed without resulting in an incorrect assembly of the whole implement. Some of the flanges 9, 15 and 18 project upwardly to a greater height than the others and these higher flanges are formed with openings which receive a rod 36 and rearward extensions 37 and 38 of said rod 36. It will be seen from FIG. 1 of the drawings that the rod 36 has substantially the same shape as the main frame beam 1 and is located thereabove while the extensions 37 and 38 thereof are located above the beams 16 and 17 respectively. The rod 36 and its extensions 37 and 38 are releasably interconnected by, for example, simple screw-threaded sleeves or the like which are shown only in outline in the drawings. Tension springs 39 interconnect anchorage points on the rod 36 and its extensions 37 and 38 and approximately the mid points of the various cranks 34. The piston rod of a hydraulic piston and cylinder assembly which is not shown in detail in the drawings is connected to the rod 36, the cylinder of said assembly being in communication with the hydraulic system of the tractor 25 or other vehicle by way of a flexible duct 40, an appropriate self-sealing connector (not shown) being provided between the duct 40 and the tractor 25. When the piston of the assembly which has just been mentioned is subjected to the pressure of oil or other hydraulic pressure medium, the rod 36 and its extensions 37 and 38 are moved axially in a direction tending to elongate the tension springs 39 (i.e. in a forward direction relative to the direction A). The rake wheels 35 can thus be caused to bear against the ground surface with less than their full weights and can, in fact, be brought to positions in which they are entirely clear of contact with the ground surface. When the implement is arranged in the working position illustrated in full lines in FIG. 1 of the drawings, it will function as a side-delivery rake, the hay or other crop displaced by the rake wheels 35 being formed into a single swath or windrow located at the right hand side of the path of travel of the implement. When a side-delivery rake of smaller working width is required, the frame beam 17 or the frame beams 16 and 17 together with the extension rod 38 or the extension rods 37 and 38 can be temporarily removed from the implement. A side-delivery rake having only three rake wheels 35 or only two rake wheels 35 will result. It is noted that, while each of the frame beams 16 and 17 carries only two corresponding sleeve bearings 32 and 33, only one of those sleeve bearings is used at any particular time in accordance with the working position of the implement which is being employed. When both of the frame beams 16 and 17 are temporarily removed, the support 19 of the caster ground wheel 21A is bolted to the coupling flange 9 at the rearmost end of the main frame beam 1.

The working width of the side-delivery rake illustrated in FIG. 1 of the drawings can, if desired, be increased rather than decreased and this is accomplished by bolting an additional frame beam 41 (similar to the frame beams 16 and 17) that is shown in broken lines in FIG. 1 to the coupling flange 9 at the leading end of the main frame beam 1. The frame beam 41 is provided with substantially horizontal sleeve bearings similar to the bearings 31, 32 and 33 and one additional rake wheel 35 is connected to one of those sleeve bearings by a crank 34 while a second additional rake wheel 35 is connected by a crank 34 to a sleeve bearing 31 located in the part 3 of the main frame beam 1, this sleeve bearing 31 not normally being used when the frame beam 41 is not employed. The leading end of the rod 36 has an extension rod 42 connected to it and the tension springs 39 that correspond to the two added rake wheels 35 have their leading ends connected to an anchorage on the extension rod 42 and an anchorage at the extreme leading end of the rod 36 respectively. When the additional frame beam 41 is employed, the support 10 of the ground wheel 31 is connected to a coupling flange located at the leading end of the frame beam 41.

In the event that the implement is used with a tractor or other vehicle which does not have a hydraulic system or has a hydraulic system which cannot conveniently be used in the operation of implements, a bracket 43 having a coupling flange 44 may be bolted to the coupling flange 18, 15 or 9 which is located at the rear end of the frame of the implement. The bracket 43 supports a cracked rotatable, but axially immovable, spindle 45 and a screw-threaded sleeve which cooperates, in known manner, with a screw thread at the rear end of the rod 36 or one of its extensions 37 or 38. Manual rotation of the spindle 45 will cause the rod 36 and any of the three extension rods 37, 38 and 42 that are provided to be moved axially to control the pressure which the rake wheels 35 exert upon the ground surface in a generally known manner.

The implement can be brought to the inoperative transport position illustrated in FIG. 3 of the drawings by turning the ground wheel 30 downwardly into the operative position shown in broken lines in FIG. 2. It will be noted that, in its inoperative position, the ground wheel 30 is located well clear of any hay or other crop displaced by the rake wheels 35. The drawbar 21 is detached from the hollow frame beam 8, is turned through 90° about the axis of its portion 20, and is then connected to the forked bracket 14 with the aid of the locking pin 26 and a transverse hole 46 (FIG. 1) formed at the rearmost end of the portion 20 of the drawbar 21. The other limb of the L-shaped foremost portion 23 of the drawbar 21 is then employed for connection to the tow bar or tool bar 24 of the tractor 25. The cranked shape of the drawbar 21 ensures that, during non-operative transport of the implement, its path of travel is substantially coincident with that of the towing tractor 25. It will be noted that an appropriate adjustment is made to the locking member 22A associated with the rearmost ground wheel 21A and that the arrangement is much the same when the additional frame beam 41 is employed since the bracket 14 will then be at the leading end of that frame beam.

The implement which has been described can be modified in a simple manner for use as a swath turner and this working position is illustrated in FIG. 4 of the drawings. The bent-over end 47 of a frame beam 48 (that extends parallel to the main frame beam 1 when in its operative position) is clamped to one side of the frame beam 8 and a strut 49 is arranged between the frame beam 7 and a central region of the frame beam 48 with the aid of brackets located at the opposite ends of said strut and pins that cooperate with a hole 50 in the frame beam 7 and a hole in a lug 51 that projects from one side of the frame beam 48. The frame beam 48 carries two sleeve bearings 52 that are similarly constructed and arranged to the previously described sleeve bearings 31, 32 and 33 except that, in this case, both of said sleeve bearings 52 are used when the implement is functioning as a swath turner. A rod 53 is mounted above the beam 48 so as to be axially displaceable through holes in a coupling flange and a lug carried by that beam. Axial displacement is effected by a bracket 43 and spindle 45 similar to those that have previously been described. The springs 39 corresponding to two rake wheels 35 are connected to locations on the rod 53. If desired, the rear end of the beam 48 may have the leading ends of an additional beam (such as the beam 41) connected to it to support a third rake wheel 35. The implement can be brought from the position illustrated in FIG. 4 of the drawings to a position suitable for side-delivery raking, without detaching the beam 48, merely by transferring the rake wheels 35 supported by said beam 48 to the previously described beams 16 and 17.

The implement has been described as being used in a rear-mounted or towed condition but, if desired, it can readily be modified for use in a front-mounted or propelled condition as illustrated in FIG. 5 of the drawings. With this arrangement, the hollow frame beam 8 receives a beam 54 which is maintained in its operative position by the locking pin 26. The ground wheel 30 and the parts that are associated therewith are detached from the implement in this working position. The rear end of the beam 54 (i.e. the end nearest the tractor 25) is provided with a bracket 55 and with a vertically adjustable supporting foot 56. A plate 57 is sandwiched between the coupling flanges which interconnect the main frame beam 1 and the additional frame beam 41, said plate 57 being rigid with a projecting bracket 58 that is similar to the bracket 55.

A transverse beam 59 is secured to the frame beams 1 and 5 with the aid of clamps 60, one projecting end of the beam 59 being provided with a second vertically adjustable supporting foot 61 that is similar to the foot 56. The strut 49 extends between the junction of the beams 7 and 8 and a bracket secured to the coupling flange 9 at the end of the main frame beam 1 that is closest to the beam 16. A hole 62 is formed through the beam 7 at its junction with the beam 8 to receive the pin that effects the connection to the end of the strut 49. It will be seen from the drawings that, in this case, the rake wheels 35 and their cranks 34 are located at the opposite sides of the beams 1, 16, 17 and 41 as compared with the previously described working positions but that the same bearing sleeves 31, 32 and 33 are employed. The ground wheel 21A, whose plane of rotation can be fixed, is replaced by a freely castering ground wheel 63 that is located at the opposite side of the frame beams 1, 16 and 17 from the rake wheels 35. Thus, in all the working positions that have been described, the operative ground wheels are located rearwardly of the rake wheels 35 relative to the direction of operative travel so that they do not interfere with the displacement of the hay or other crop in any way.

In the use of the implement in the working position illustrated in FIG. 5 of the drawings, the brackets 55 and 58 are connected to a tool bar 64 at the front of the tractor 25 in a generally known way which is such that the implement can pivot relative to the tractor 25 about the longitudinal axis of said tool bar 64. The implement is thus supported only by the tractor 25 and the caster ground wheel 63 which is located near the front of the implement. When operating as illustrated, the implement will function as a side-delivery rake of large working width but this working width can, if desired, be altered by changing the length of the frame as described with reference to FIG. 1 of the drawings. When the implement is to be disconnected from the tractor 25, the feet 56 and 61 are first lowered into, and retained in, effective positions so that, after releasing the brackets 55 and 58 from the tool bar 64, the implement will remain in an upright and stable position since it will be supported at three points afforded by the feet 56 and 61 and the ground wheel 63. If the tractor 25 does not have a hydraulic system which can be connected to the duct 40, then the previously described bracket 43 carrying the spindle 45 can be mounted at the rearmost (with respect to the direction of operative travel in FIG. 5 of the drawings) end of the additional frame beam 41 as shown in broken lines in FIG. 5.

It will be appreciated that a user of the implement which has been described can, with a relatively small number of standard parts, vary the mode of use of the implement to allow it to undertake a variety of different working operations under a number of different working conditions. It will also be appreciated that a user of the implement need not be supplied with all of the parts which have been described if he is content with only, say, one or two of the possible modes of operation of the implement.

Having thus described my invention, what I claim as new and desire to secure by Letters Patent of the United States is:

1. A raking implement for attachment to a prime mover comprising a wheeled frame and a plurality of rake wheels rotatably mounted on a main beam of said frame, a second frame beam having one end rigidly secured to said main beam and being inclined rearwardly therefrom, the other end of said second frame beam being fastened to a further beam of a frame portion to form a frame beam means therewith of generally open V-configuration across the path of travel when seen in plan view, one end of said frame portion being connectable to the prime mover whereby said main beam is positioned to extend substantially diagonally across the path of travel of the implement in operation.

2. An implement as claimed in claim 1, wherein said main beam includes two substantially parallel beam parts interconnected by an intermediate inclined part, said intermediate part being inclined to said beam parts by angles of about 20°, coupling means on the foremost of said beam parts for optionally connecting a beam extension to said implement.

3. An implement as claimed in claim 1, wherein said frame portion has two further relatively inclined beams and an angle of about 30° is enclosed between said main beam and said second frame beam.

4. An implement as claimed in claim 3, wherein an angle of about 120° is enclosed between said second frame beam and said frame portion and an angle of about 135° is enclosed between said two further beams of said frame portion.

5. An implement as claimed in claim 1, wherein a drawbar is attached to one end of said frame portion, said drawbar having an intermediate bent portion whereby one of its ends is offset relative to its opposite and attaching end.

6. An implement as claimed in claim 5, wherein said drawbar extends rearwardly from its center to said frame portion and obliquely downwardly and forwardly, relative to the intended direction of operative travel, from its center to the point of connection of the attaching end of said drawbar to the prime mover.

7. An implement as claimed in claim 6, wherein said drawbar is connectable to said coupling means on the foremost of said beam parts to place said implement in transport position, whereby said main beam extends generally parallel to the direction of travel when said frame portion is disconnected from the prime mover.

8. An implement as claimed in claim 5, wherein said drawbar has portions one of which is substantially horizontally disposed during operation and which is insertable in a hollow part of said frame portion, means connected to said drawbar to secure same to said frame portion, the portions of said drawbar being inclined towards one another so that an angle of about 135° is enclosed between said portions.

9. An implement as claimed in claim 1, wherein a ground support wheel is mounted on a joint to swivel on said implement adjacent said coupling means.

10. An implement as claimed in claim 9, wherein, when said implement is in transport position, one end of said drawbar is connected to the mounting of said ground wheel joint so as to be turnable relative thereto about a substantially horizontal axis, the attaching and opposite end of said drawbar being turnable about a substantially vertical axis with respect to the prime mover.

11. An implement as claimed in claim 1, wherein a strut is connectable between the junction of said second beam and said frame portion, an additional frame beam with rake wheels being connected to said frame portion, said strut being positionable to form a supporting connection between said additional frame beam and the remainder of said implement, whereby a swath turner is arranged to work two rows of crop in operation.

12. An implement as claimed in claim 1, wherein said main beam has sleeve bearings which extend transversely through said main beam and said rake wheels are mounted to rotate on axles which can be entered in either side of said bearings whereby said rake wheels can be positioned on either side of said main beam.

13. An implement as claimed in claim 1, wherein said implement has two coupling brackets for connection to a tool bar at the front of a prime mover, said main beam having coupling flanges at each end thereof, one of said coupling brackets being fastened to a flange on said main beam, the other coupling bracket being connected to a connection beam which is entered internally in said frame portion, said connection beam being releasably secured to said frame portion.

14. An implement as claimed in claim 1, wherein one end of a strut is fastened to the end of said second frame beam remote from said main beam to extend approximately in axial elongation of said second frame beam, a third frame beam with rake wheels being connected to said frame portion and the opposite end of said strut being pivotally connected to approximately the mid point of said third frame beam.

15. An implement as claimed in claim 1, wherein said implement is connectable to the front of a prime mover, one end of said main beam having a flanged bracket connected to the prime mover, the opposite end of said main beam being connected to said frame portion by a strut, said strut being in approximate axial alignment with part of said frame portion, said part of the frame portion being hollow, and a connection beam entered in said frame portion, said connection beam having a bracket connected to the prime mover and a vertically adjustable supporting foot secured adjacent one end of said connection beam adjacent the prime mover.

16. An implement as claimed in claim 1, wherein said main beam includes coupling means at the front end thereof, an extension beam being connectable to said main beam with said coupling means, said extension beam having additional rake wheels whereby the normal working with said implement can be increased.

17. An implement as claimed in claim 1, wherein sleeve bearings are passed through said main beam and said bearings are inclined to the longitudinal axes of said main beam at angles of about 70° and said rake wheels being mounted on cranks journaled in said bearings.

18. An implement as claimed in claim 1, wherein a lifting mechanism is associated with said implement for vertically moving said rake wheels, said lifting mechanism comprising at least one rod which extends substantially parallel to said main beam, said rod being connected to said cranks on said rake wheels and said rod being axially displaceable to raise and lower said rake wheels, said rod supported on said main beam at points located substantially centrally above said bearings.

19. An implement as claimed in claim 1, wherein the implement includes a first ground wheel positioned adjacent the prime mover, said first ground wheel being turnable about a substantially horizontal axis and locking means on said implement to retain said first ground wheel in any one of at least two different angular settings about said axis.

References Cited

UNITED STATES PATENTS

| | | | |
|---|---|---|---|
| 2,602,280 | 7/1952 | Crowe et al. | 56—377 |
| 2,635,411 | 4/1953 | Hicks | 56—377 |
| 2,923,118 | 2/1960 | Van der Lely et al. | 56—377 |
| 3,006,132 | 10/1961 | Van der Lely et al, | 56—370 |
| 3,015,200 | 1/1962 | Van der Lely et al. | 56—377 |
| 3,069,833 | 12/1962 | Van der Lely | 56—366 |
| 3,320,735 | 5/1967 | Sutherland et al. | 56—377 |
| 3,377,789 | 4/1968 | Van der Lely | 56—377 |
| 3,466,860 | 9/1969 | Winkel et al. | 56—377 |

FOREIGN PATENTS

| | | | |
|---|---|---|---|
| 106,898 | 12/1963 | Netherlands | 56—377 |
| 931,424 | 7/1963 | Great Britain | 56—377 |
| 376,700 | 5/1964 | Switzerland | 56—377 |
| 992,416 | 5/1965 | Great Britain | 56—377 |

RUSSELL R. KINSEY, Primary Examiner